United States Patent [19]
Torii et al.

[11] Patent Number: 5,313,521
[45] Date of Patent: May 17, 1994

[54] KEY DISTRIBUTION PROTOCOL FOR FILE TRANSFER IN THE LOCAL AREA NETWORK

[75] Inventors: Naoya Torii, Kawasaki, Japan; David B. Newman, Jr., La Plata, Md.

[73] Assignee: Fujitsu Limited, Japan

[21] Appl. No.: 868,571

[22] Filed: Apr. 15, 1992

[51] Int. Cl.$^5$ ............................................. H04L 9/08
[52] U.S. Cl. ...................................... 380/21; 380/25; 380/49
[58] Field of Search ............................ 380/21, 25, 49

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,283,599 | 8/1981 | Atalla | 380/23 |
| 4,386,233 | 5/1983 | Smid et al. | 380/21 |
| 4,405,829 | 9/1983 | Rivest et al. | 380/30 |
| 4,424,414 | 1/1984 | Hellman et al. | 380/30 |
| 4,458,109 | 7/1984 | Mueller-Schloer | 380/21 |
| 4,514,592 | 4/1985 | Miyaguchi | 380/30 |
| 4,567,600 | 1/1986 | Massey et al. | 380/30 |
| 5,124,117 | 1/1992 | Tatebayashi et al. | 380/21 |
| 5,140,634 | 8/1992 | Guillou et al. | 380/25 |
| 5,146,497 | 9/1992 | Bright | 380/21 |
| 5,150,411 | 9/1992 | Maurer | 380/21 |

OTHER PUBLICATIONS

D. E. Denning, "Cryptology and Data Security", Addison-Wesley, 1983, pp. 7–14, 56–58, 92–133, 161–179, 187–189, 209–213, and 259–263.

M. Tatebayashi, N. Matuzaki and D. B. Newman, Jr., "Key Distribution Protocol for Digital Mobile Communications Systems", Advances in Cryptologgy: Proceedings of Crypto '89, Springer–Verlag, pp. 324–334, 1989.

W. F. Ehrasam, S. M. Matayas, C. H. Meyer, and W. L. Tuchman, "A Cryptographic Scheme for Implementing the Data Encryption Standard," IBM System Journal vol. 17, No. 2, pp. 106–125, 1978. Federal Information Standards Publication 81 (FIPS Pub. 81), National Bureau of Standards, 2 Dec. 1980.

R. M. Needham and M. D. Schroeder, "Using Encryption for Authentication in Large Networks of Computers", Commun. of the ACM 21, pp. 993–999, Dec. 1978.

R. L. Rivest, A. Shamir, and L. Adleman, "On Digital Signatures and Public–Key Cryptosystems", Commun. of the ACM, vol. 21, pp. 120–126, Feb. 1978.

ISO–8372 (Aug. 15, 1987) Int. Stnd. "Info. Proc.–Modes of Operation for a 64–bit Block Cipher Algorithm".

Primary Examiner—Salvatore Cangialosi
Attorney, Agent, or Firm—David Newman & Associates

[57] ABSTRACT

A cryptographic communications apparatus and method for use with a first terminal, a file server, a key distribution center and a communications channel. The method is made simple by using classical-key-encryption algorithms for electronic generation of session keys. The terminal is verified at a key distribution center, using time stamp and secret identification numbers. Each path is encrypted, with each encrypted message decoded at the key distribution center and file server.

28 Claims, 6 Drawing Sheets

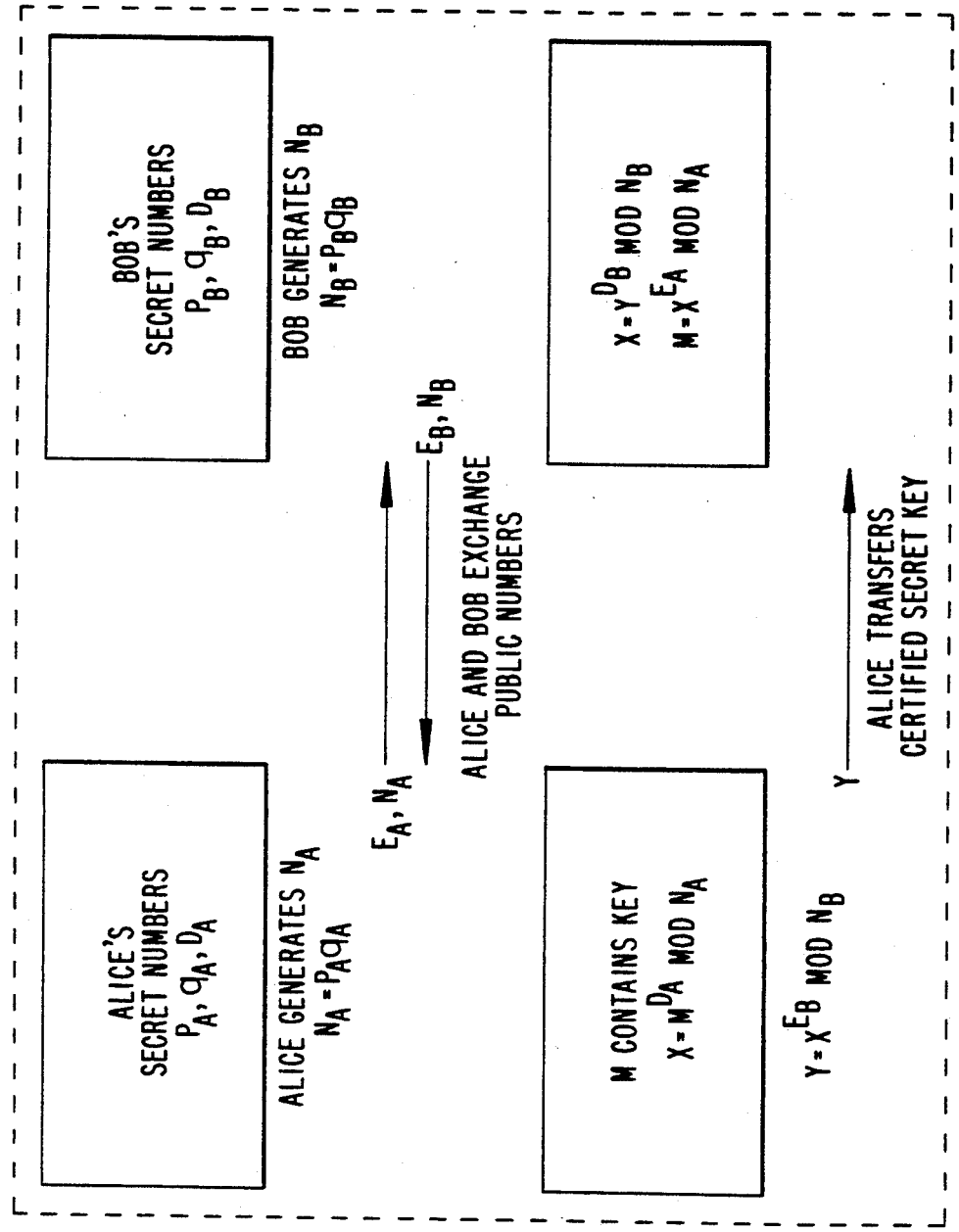

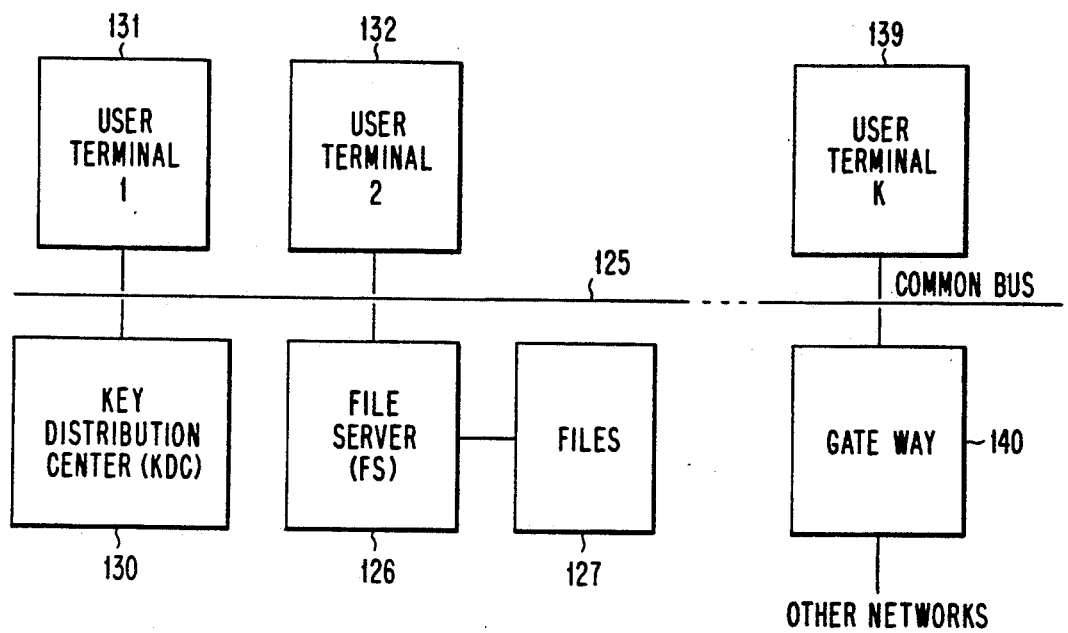
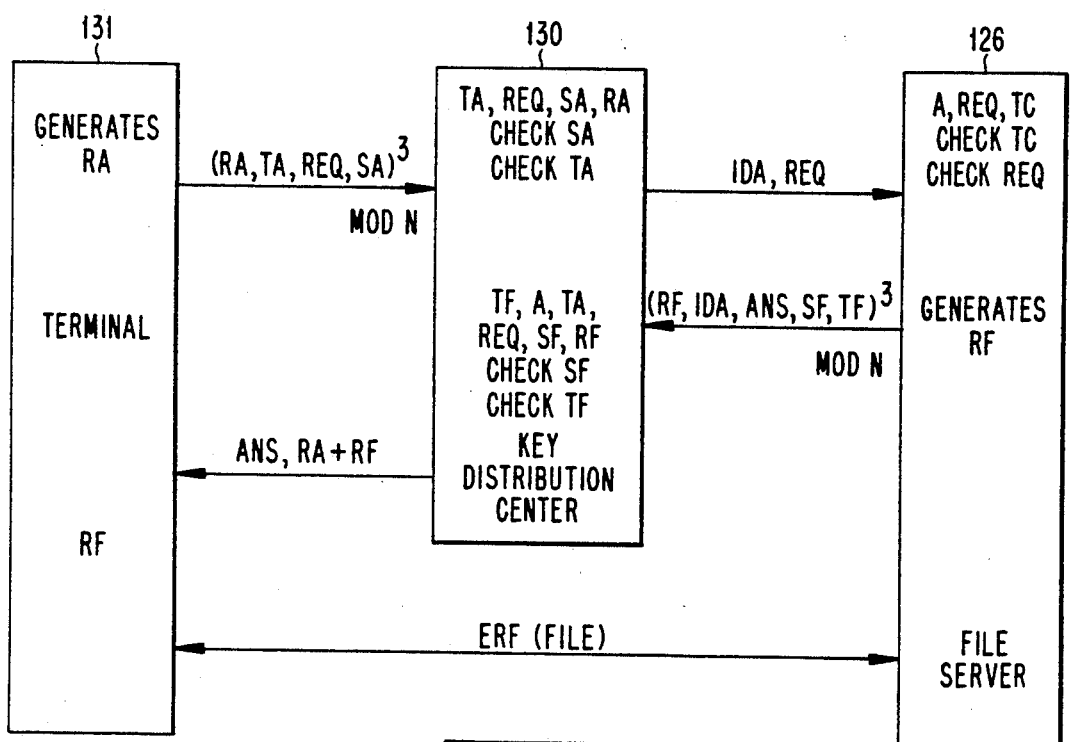

KEY DISTRIBUTION PROTOCOL FOR FILE TRANSFER IN THE LOCAL AREA NETWORK

RELATED PATENTS

This invention is related to U.S. Pat. No. 4,200,770 entitled "Cryptographic Apparatus and Method", to *W. Diffie and M. E. Hellman*, Apr. 29, 1980; U.S. Pat. No. 4,405,829 entitled "Cryptographic Communications System and Method", to *R. Rivest, A. Shamir and L. Adleman*, Sept. 20, 1983; and, U.S. Pat. No. 4,424,414, entitled "Exponentiation Cryptographic Apparatus and Method", to *S. C. Pohlig and M. E. Hellman*, which are all expressly incorporated herein by reference.

BACKGROUND OF THE INVENTION

This invention relates to digital computer communications systems and more particularly, to a method and system employing a protocol for establishing a secure secret key between two or more terminals through a key distribution center.

DESCRIPTION OF THE RELEVANT ART

Awareness of the value of information together with advances in modern state-of-the-art telecommunications technologies including personal computers, local area networks, distributed data bases, pocket radio, satellite teleconferencing, electronic mail, and electronic funds transfer, has stimulated and increased awareness of the vulnerability of communications links to interception and of the susceptibility of databases to exploitation and tampering. This same telecommunications revolution has made the wide spread availability of technology for implementing techniques which can provide authenticated communications that also can be made secure against eavesdropping or tampering.

Primary users of a secure network of communicators include the banking community which has a need for ensuring that funds, electronically transferred, are sent correctly: a message authentication problem. Similarly, the stocks and securities community, which operates on a computer network, has a requirement that the buying and selling of stocks are authentically sent to and from the correct person.

In response to this revolution and awareness, communicators increasingly have become aware of communications privacy and security. A technical solution, for providing security against both eavesdropping and the injection of illegitimate messages, includes cryptography. Two generic approaches to key distribution are classical cryptographic techniques and public key cryptographic techniques. Classical cryptography requires that, for ensuring secure communications, communicators must have keys that are identical. The encryption key is used to "lock" or secure the messages and a receiver must have an identical key to "unlock" or decrypt the messages. A problem arises with key distribution in a large network of communicators who wish to communicate with each other securely.

A major problem with classical cryptographic techniques is key distribution in a large network which requires $n(n-1)/2$ keys for n nodes. As shown in FIG. 1, a message, M, which is encrypted with an encryption key $E_A$, into a cipher text, C, requires having the key distributed over a private channel to the receiver. This requirement includes the generating, storing, distributing, destructing and archiving of key variables which are essential elements of encipherment. Typically, a courier is responsible for distributing the keys over the private channel. For a large network of communicators, this requires a courier to distribute the key to many users. Further, if all communicators in the network are using the same key and if the key is compromised by any one communicator, then the whole network is compromised.

The advent of inexpensive electronics hardware has facilitated means for providing the security of communications. In computer communications networks in particular, public key cryptography, which may be viewed as a multiple access cryptographic technique, provides a relatively inexpensive means for distributing keys among communicators and ensuring communications privacy and message authentication in comparison to conventional cryptographic techniques.

Public Key Cryptographic Concepts

Public key cryptographic systems are based on the trapdoor one-way function. Consider first, the concept of a one-way function. A one-way function is an easily computed function whose inverse is computationally infeasible to find. That is, for a Y=f(X), given an X, Y is easy to compute. However, given a Y, X is difficult to compute.

The Diffie-Hellman public key cryptographic system is based on exponentiation of number p, in a Galois field, GF(p).

The basic computations for the Diffie-Hellman public key encryption are as follows:

ENCRYPTION: $Y = X^E$ modulo $p$
DECRYPTION: $X = Y^D$ modulo $p$
$X, Y$ are integers $< p$.

where X is the plain-text, Y is the ciphertext, E is the secret encryption exponent and D is the secret decryption exponent.

A key management system based on the work of Diffie-Hellman and Hellman-Pohlig, and independently on the work of Merkle, is two pronged: first, a common secret number is established between two communicators, without either communicator having exchanged any secret information. Second, this common secret number is then used as a key in conventional cryptographic systems, for example, employing the Data Encryption Standard (DES), for enciphering messages.

The security of the Diffie-Hellman system rests on the difficulty of performing discrete logarithms in the finite field, denoted GF(p), of integers modulo p, a very large prime number. A basic conjecture is that exponentiation in GF(p) is a one-way function for a large prime number p. Given integers X and N, it is easy to compute the equation $Y=X^N$ modulo p, where $0 \leq X \leq p$. Given Y and X it is hard to compute N in the above equation, because it is computationally hard to take a discrete logarithm, $N=\log_X(Y)$, in GF(p). Indeed, for the best known algorithm for finding discrete logarithms, GF(p), it is believed to be impractical to compute the discrete logarithm on a Cray machine when p is a 1000-bit prime number. In contrast, it takes a fraction of a second to compute the exponentiation, GF(p). Encryption and decryption are both to be done with exponentiation.

For example, an encryption exponent E and decryption exponent D can be derived using Euler's Theorem from number theory to satisfy $$D \cdot E = 1 \text{ modulo } (p-1)$$

This is a necessary relationship for D to be the exponential inverse of E; that is, $(X^E)^D = 1$ modulo p. This relationship can be used to encrypt a message X, an integer less than p, by the exponentiation operation $Y = X^E$ modulo p and to decrypt this message by another exponentiation operation, $X = Y^D$ modulo p.

Here E and D are kept secret and E can be obtained easily from D and vice versa. Given p, X, and Y satisfying the above two equations it is computationally difficult to find the secret encryption exponent E for a large prime number p, due to the difficult problem of taking discrete logarithms in GF(p). For a prime number p of 512 bits it is estimated to be many times more difficult to perform a discrete logarithm than a brute force attack on the DES algorithm.

An important property of the encryption and decryption function based on exponentiation in GF(p) is the commutative property where $X^{31}$ modulo $p)^{32}$ modulo $p = (X^{32}$ modulo $p)^{E1}$ modulo p.

This property allows two communicators in a network, hypothetically terminal A and terminal B, to share a secret number by only exchanging non-secret numbers.

Assume the entire network has fixed known constants, not necessarily secret:

p = prime number
and a is any integer between 0 and p−1.

For terminal A and terminal B to obtain a shared secret number, terminal A randomly generates a secret number, $X_A$ = terminal A's secret number, and computes a corresponding public number, $Y_A = a^{X_A}$ modulo p.

Terminal B also randomly generates a secret number, $S_B$ = terminals B's secret number, and computes a corresponding public number, $Y_B = a^{X_B}$ modulo p.

For a large prime number, it practically is impossible to obtain the secret numbers from the public numbers.

Terminal A and terminal B can share secret number that is unique to them while only exchanging non-secret public numbers. Specifically, suppose terminal A sends his public number, $Y_A$, to terminal B while terminal B sends his public number, $Y_B$, to terminal A. By the commutative property, terminal A can compute $Z = Y_B^{X_A}$ modulo p while terminal B can compute the same number by $Z = Y_A^{X_B}$ modulo p.

Next terminal A and terminal B compute $Z^*$, the reciprocal of Z, such that $Z \cdot Z^* = 1$ modulo (p−1).

In a particular Diffie-Hellman system the prime number p is chosen to satisfy $$p = 2q + 1$$

where q is a prime number. Then if Z is an odd integer, $Z^* = Z^{1-2}$ modulo (p−1)

which is another exponentiation. If Z is not an odd number then terminal A and terminal B first can convert Z to an odd number and then compute $Z^*$.

The shared secret number Z and $Z^*$ are used by terminal A and terminal B to encrypt and decrypt messages where E = Z is the encryption exponent and D = $Z^*$ is the decryption exponent. For most encrypted network applications terminal A and terminal B would exchange encryption keys from conventional encryptors using Z and $Z^*$. This is because encryption with exponentiation may be too slow for most data networks.

The basic Diffie-Hellman technique is illustrated in FIG. 2, with secret numbers shown enclosed inside boxes. For this illustration, the secret numbers are never transmitted in the clear or delivered by couriers. A message M sent by transmitter A and terminal B can be keys for conventional encryptors.

It may be desirable for both terminal A and terminal B to contribute independent random bits to the generation of keys. For example, terminal A and terminal B can independently generate random bits to form messages which they exchange securely using Z and $Z^*$ as shown above. The final encryption keys can then be some function of these independently and randomly generated bit sequences such as taking bit by bit modulo 2 addition of the two bit sequences. Another possibility is for terminal A and terminal B to independently generate new secret and public numbers, exchange these public numbers, compute a new shared secret number S, and combine this with the original shared secret number Z to form secret encryption keys. For example, keys might be of the form M = Z·S modulo p.

RSA System

RSA is a public key encryption technique invented by Rivest, Shamir, and Adleman, supra. The security of the RSA system rests on the difficulty of factoring integers into their prime components. As with the Diffie-Hellman system, encryption and decryption are both done with exponentiation. In the RSA system, however, the modulus is not a prime number as in the Diffie-Hellman technique. Instead, the modulus is a product of two secret prime numbers and for security the modulus must be unique to each user in the network.

Using the RSA system, terminal A and terminal B can exchange secret messages by first exchanging non-secret public number. Terminal B first randomly generates two large secret prime numbers, ($p_B$, qB) = terminal B's secret prime numbers,
a secret decryption exponent,
DB = terminal B's secret decryption exponent, and a non-secret public encryption exponent, $E_B$ = terminal B's public encryption exponent which satisfies $E_B \cdot D_B = 1$ modulo $[(p_B - 1)(q_B - 1)]$.

In general, to obtain $D_B$ from $E_B$, one would have to know the prime numbers $p_B$ and $q_B$. Hence without knowledge of terminal B's secret prime numbers, knowing the public encryption exponent $E_B$ does not reveal the decryption exponent $D_B$. In order for the RSA system to be "strong", each of the numbers $p-1$ and $q-1$ should have large prime factors.

For terminal A to send a secret message to terminal B, terminal B must send to terminal A his public numbers $N_B = p_B q_B$, and $E_B$.

Then terminal A can send the message X by exponentiation, $Y = X^{E_B}$ modulo $N_B$ Only terminal B can decrypt this message by similar exponentiation with his secret decryption exponent, $X = Y^{D_B}$ modulo $N_B$ In addition, terminal B can send a certified non-secret message M to terminal A by sending, $C = M D_B$ modulo $N_B$ with which terminal A can obtain M from $M = C^{E_B}$ modulo $N_B$ since it knows terminal B's public numbers. In fact, anyone that has terminal B's public numbers can obtain the message M from C. Only terminal B, however, could have computed C from M. Upon converting C to M, terminal A or anyone else who has terminal B's public numbers knows that the message M came from terminal B. Thus, the message M has been signed (authenticated or certified) by terminal B in this procedure. Terminal A also can randomly generate secret prime numbers, $(p_A, q_A)$ = terminal A's secret prime numbers, a secret decryption exponent, $D_A$ = terminal A's secret decryption exponent, and a non-secret public encryption exponent, $E_A$ = terminal A's public encryption exponent, which satisfies (using Euler's Theorem)

$E_A \cdot D_A = 1$ modulo $[(p_A - 1)(q_A - 1)]$.

If terminal A and terminal B were to exchange their public numbers then they can exchange secret signed messages in both directions. For a network of encryptors these secret messages are typically keys for conventional encryptors. FIG. 3 illustrates the RSA technique.

Note that in the RSA technique, every user in the system must have a distinct composite number made up of two large prime numbers; whereas, in the Diffie-Hellman technique a single prime number suffices for the entire network. This latter technique simplifies the computations for encryption and decryption since all the users in the network perform their computations modulo a single number, p.

A key distribution system for digital mobile communications system was proposed by M. Tatebayashi, N. Matuzaki and D. B. Newman, Jr., "Key Distribution Protocol for Digital Mobile Communications Systems, ADVANCES IN CRYPTOLOGY: PROCEEDINGS OF CRYPTO '89, Springer-Verlog, pp. 324–334, 1990. Their scheme generates a session key between mobile users who are hardware limited for encryption by way of a trusted key distribution center.

OBJECTS AND SUMMARY OF THE INVENTION

An object of the present invention is to provide a protocol for establishing secure secret keys between two or more terminals communicating in a computer network through a key-distribution center.

Another object of the present invention is to enable hardware-limited terminals to obtain a common secret key in a reasonable time.

An additional object of the present invention is to provide secret keys for terminals in a computer network.

According to the present invention, as embodied and broadly described herein, a cryptographic communications system and method are provided for use in a computer network with a first terminal, a second terminal, a key-distribution center and a communications channel. The first terminal optionally may have first structure means. The first terminal includes first generating means, first encoding means, third decoding means, and third verifying means. The first generating means generates a first identification signal and a request signal. The first structure means, if employed, generates a first structured data signal. The first encoding means is coupled to the first generating means, the first structured means, and the communications channel. The first encoding means uses a classical-key-encryption algorithm with a first encryption-key signal. The first encryption-key signal may be an identification signal previously sent to the first terminal from the key-distribution center. The first encoding means transforms the first identification signal, the first structured-data signal and the request signal, to a first ciphertext signal. Additionally, the first encoding means transmits the first ciphertext signal over the communications channel.

The key-distribution center includes first decoding means, first verifying means, second generating means, second encoding means, and optionally first structure-verifying means. The first decoding means is coupled to the communications channel. The first decoding means uses a classical-key-decryption algorithm with the first encryption-key signal. The first decoding means decodes the first ciphertext signal to generate, at the key-distribution center, the first identification signal, the structured-data signal and the request signal. The first verifying means is coupled to the first decoding means. The first verifying means verifies the first identification signal, and upon verifying the first identification signal, generates a first verification signal. The first structure-verifying means additionally verifies the first structured-data signal and generates a structured-verification signal.

The second generating means is coupled to the verifying means and the first structure-verifying means, if employed. In response to the first verification signal, the second generating means generates a second identification signal. If the first structure-verifying means is employed with the structured-data signal, then the second encoding means is also responsive to the structured-verification signal. Otherwise, in response to the first verification signal, the second encoding means transforms the first identification signal, the second identification signal and the request signal to a second ciphertext signal, and transmits the second ciphertext signal over the communications channel. During this process, the second encoding means uses the classical-key-encryption algorithm with a second encryption-key signal.

The key-distribution center also may have second structure means for generating a second structured-data signal. The second structure means is coupled to the second encoding means. When employing the second structure means, the second encoding means transforms the first identification signal, the request signal and the second structured-data signal to a second ciphertext signal.

The second terminal includes second decoding means, second verifying means, third generating means and third encoding means. The second terminal optionally would employ second structure-verifying means if the second structure means were employed at the key-distribution center. The second decoding means is coupled to the communications channel, and the second verifying means is coupled to the second decoding means. The third encoding means is coupled to the third generating means, the second decoding means, and the communications channel.

The second decoding means uses the classical-key-decryption algorithm with the second encryption-key signal. The second decoding means decodes the second ciphertext signal to generate the first identification signal, the second identification signal and the request signal. The second verifying means verifies the second identification signal and verifies access rights of the first identification signal with respect to the request signal. In response to verifying the second identification signal and the access rights, the second verifying means generates a second verification signal. If a structured-data signal were employed between the key-distribution center and the second terminal, then the second structure-verifying means verifies the second structured data signal embedded in the second ciphertext signal. In response to the second verification signal, the second structured-verification signal and the request signal, the third generating means generates a third identification signal, an answer signal, and a communication-encryption-key signal.

The third encoding means uses the classical-key-encryption algorithm with the second encryption-key signal. The third encoding means transforms the communication-encryption-key signal, the answer signal, the first identification signal and the third identification signal, to a third ciphertext signal. Additionally, the third encoding means transmits the third ciphertext signal over the communications channel.

At the key distribution center, the first decoding means decodes, using the classical-key-decryption algorithm with the second encryption-key signal, the third ciphertext signal. Accordingly, the first decoding means outputs the communication encryption-key signal, the answer signal, the first identification signal and the third identification signal. The first verifying means verifies the third identification signal, and in response to verifying the third identification signal, generates a third verification signal. Upon receiving the third verification signal, the second encoding means transforms the communication-encryption-key signal, the answer signal, the first identification signal and the second identification signal to a fourth ciphertext signal. The second encoding means uses the classical-key-encryption algorithm with the first encryption key signal for this transformation. The second encoding means transmits the fourth ciphertext signal over the communications channel.

At the first terminal, the third decoding means, which is coupled to the communications channel, decodes the fourth ciphertext signal, and outputs the communication-encryption-key signal, the answer signal, the first identification and the second identification signal. The third decoding means uses the classical-key-decryption algorithm with the first encryption-key signal for the decoding. The third verifying means, which is coupled to the third decoding means, verifies the first identification signal and the second identification signal. In response to the answer signal and to verifying the first identification signal and the second identification signal, the third verifying means generates a fourth verification signal.

Upon receiving the fourth verification signal and the answer signal at the first terminal, means, located at the first terminal and the second terminal, use the communication-key-encryption signal for communicating between the first terminal and the second terminal with an encrypted signal.

The present invention alternatively may have a path from the first terminal to the key-distribution center to the second terminal and from the second terminal back to the first terminal, bypassing the key-distribution center when communicating from the second terminal to the first terminal.

Additional objects and advantages of the invention ar set forth in part in the description which follows, and in part are obvious from the description or may be learned by practice of the invention. The objects and advantages of the invention also may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3 illustrates the RSA public key system;

FIG. 4 illustrates a system configuration;

FIG. 5 illustrates a prior art mobile radio protocol;

DETAILED DESCRIPTION OF THE PREFERRED EMBODIMENTS

Figure 1:
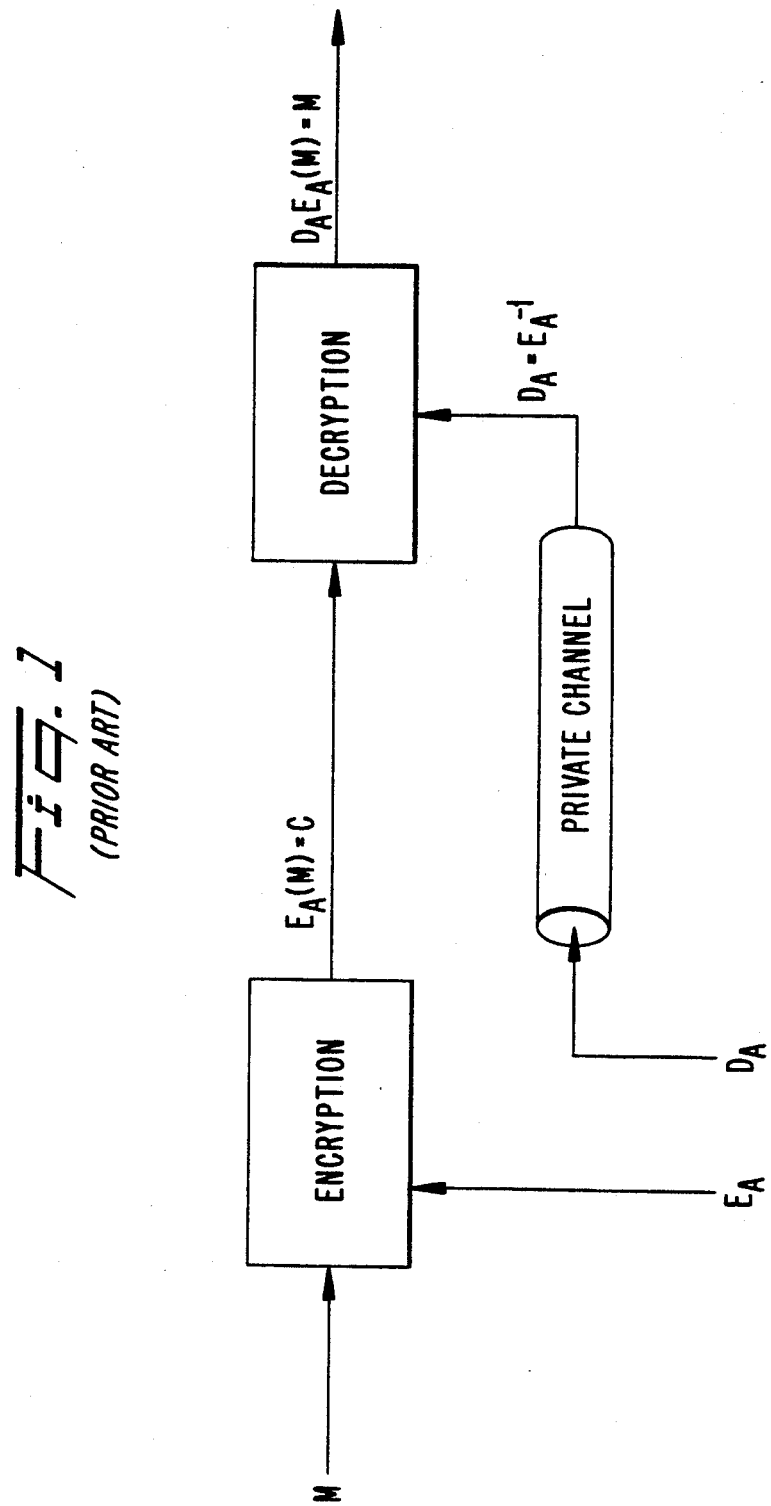
FIG. 1 illustrates a classical cryptographic system having the decryption key transferred over a private channel.
Figure 2:
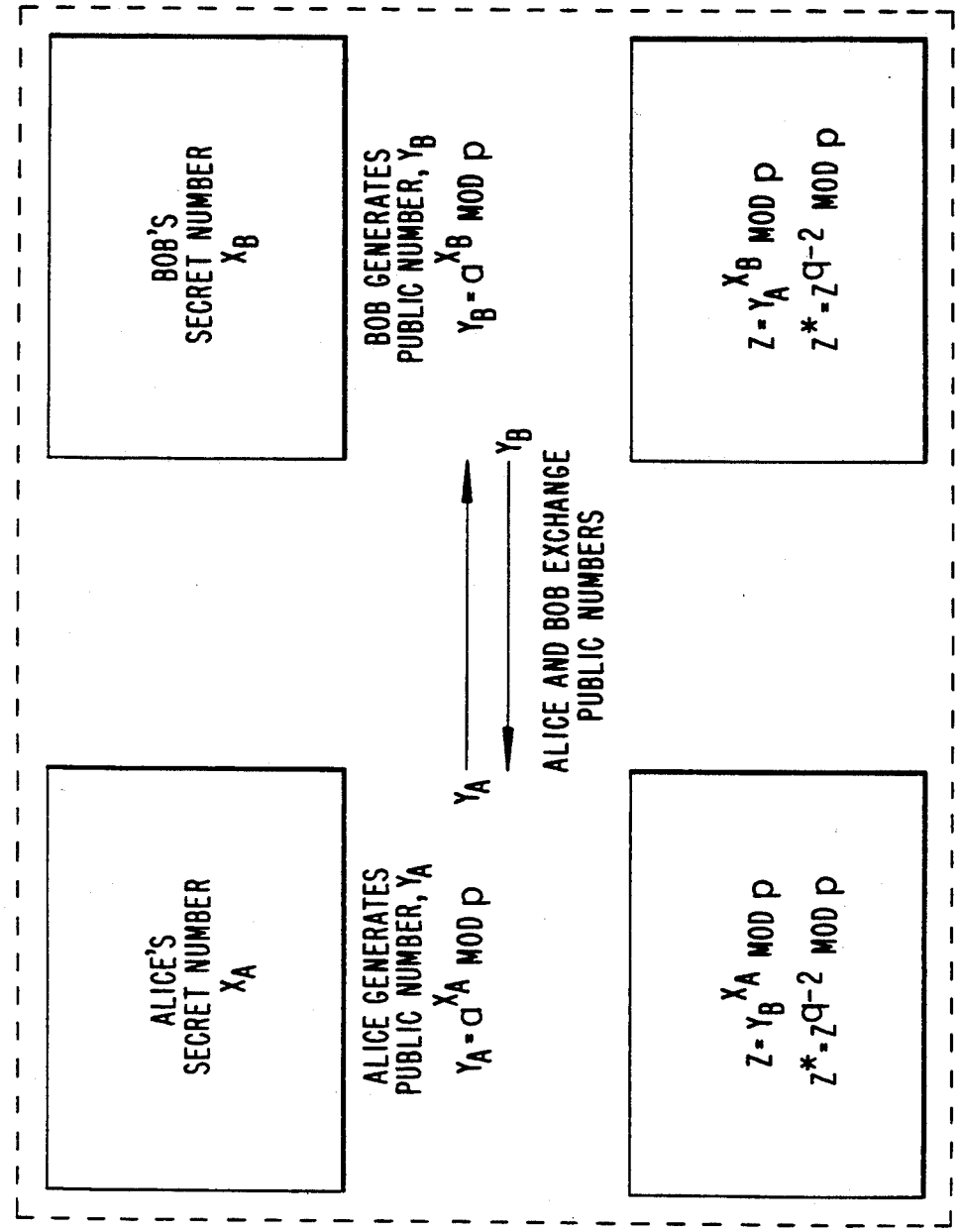
FIG. 2 illustrates the Diffie-Hellman public key system.

Reference will now be made in detail to the present preferred embodiments of the invention, examples of which are illustrated in the accompanying drawings, wherein like reference numerals indicate like elements throughout the several views.

The present invention provides a protocol for the key exchange between a terminal and a file server in a Local Area Networks (LAN). Various topologies can be used with the LAN. The present invention employs the common bus topology, as used with Ethernet. Many key exchange protocols have been propose for the computer network. D. E. Denning, "Cryptography and Data Security", Addison-Wesley, 1983, R. M. Needham and M. D. Schroeder, "Using Encryption for Authentication in Large Networks of Computers", COMMUN. OF THE ACM 21, pp. 993-999, December 1978, W. F. Ehrasam, S. M. Matayas, C. H. Meyer, and W. L. Tuchman, "A Cryptographic Scheme for Implementing the Data Encryption Standard", IBM SYSTEM JOURNAL 17, No. 2, pp. 106-125, 1978. The present invention provides a session key exchange protocol that has less computational burden for the terminals. In this protocol a secret key cryptosystem is used for high speed encryption processing at hardware-limited terminals.

The system configuration used by the present invention is shown in FIG. 4. Every terminal is connected to, and can communicate by way of, a communication channel, which is embodied as a common bus 125.

A file server 126 is connected to the common bus 125. The file server 126 controls access to files 127 from terminals by an access rights table assigned by an authorized terminal. The access rights table is physically and logically protected and only an authorized terminal can modify it.

A confidential file is encrypted by a classical encryption system. The encryption keys, which are embodied as encryption-key signals, are stored with a file master key in a physically and logically protected file. When a terminal requests a file access, the file server 126 checks the access rights for the terminal. If access is granted, then the file is decrypted by the file master key, and encrypted by a session key for the file transfer.

A key distribution center 130 is connected to the common bus 125, and has the means for key management. The key distribution center 130 has the protected secret key file in which is stored the encryption-key signals. A special purpose processor is equipped for enabling the high speed processing necessary for public key encryption systems. Only an authorized terminal can access the secret key file. The key distribution center's hardware and software are protected logically and physically.

Every $i^{th}$ terminal 131, 132, 139, ($i=1, 2 \ldots k$) and each terminal from a gateway 140, has a secret key si, which is embodied as an encryption-key signal, and the file server 126 has the secret master keys, si and sf, embodied as encryption-key signals, for encryption communication with the key distribution center 130, respectively. These encryption-key signals are assigned and distributed by the key distribution center 130.

In the following example, the RSA system described in R. L. Rivest, A. Shamir, and L. Adleman, "On Digital Signatures and Public-Key Cryptosystems", COMMUN. OF THE ACM, vol. 21, pp. 120-126, February 1978 is employed as a the public key encryption algorithm. A modulus number n is the product of two large prime numbers p, q, as used with the meaning of the RSA system. An e is the public key of the key distribution center, and d is a secret key. The public key e and the secret key d satisfy $$e \cdot d = 1 \bmod \text{LCM} [(p-1), (q-1)],$$

where LCM is the least common multiplier. The secret key e is selected to be equal to 3 for fast computation at the terminal. The Data Encryption Standard (DES), set forth in Federal Information Standards Publication 46 (FIPS PUB46), National Bureau of Standards, 2 Dec. 1980, is used herein as a classical-key-encryption algorithm. Assume that the DES algorithm can be processed within reasonable time by a general purpose processor equipped in the terminal. On the other hand, RSA needs a special purpose processor for fast encryption when the key length is long.

Referring to FIG. 5, the key distribution scheme for mobile communication system of Tatebavashi et al., supra, is applied to the file transfer. Assume that a first terminal 131 desires access to a file and needs to know a session key. The rough data flow of key distribution protocol is as follows.

Initially, the first terminal 131 sends a random number ra as a key-encryption-key signal to the key distribution center 130. The key distribution center 130 informs the file server 126 of the request from the first terminal 131. Then the file server 126 generates a random number rf as a session-key signal for file transfer, and sends the random number rf to the key distribution center 130. The key distribution center 130 processes the random number rf and the random number ra such that random number rf is encrypted by random number ra as an encrypted number. The processing of the random number ra and the randomly number rf typically is performed with an EXCLUSIVE-OR gate. The key distribution center 130 sends the encrypted number to the first terminal A 131. The first terminal 131 receives the encrypted number and decrypts the encrypted number to obtain random number rf as a file transfer session key. For secure communication from the first terminal 131 to the key distribution center 130 and from the file server 126 to the key distribution center 130, the RSA cryptosystem is employed. To prevent reuse of the previously transmitted data and unauthorized terminal access, a time stamp ta and a secret terminal identification number sa are concatenated in the transmitted data. As a result, the protocol, as illustratively used with the system shown in FIG. 5, can be summarized as follows:

(1) The first terminal 131 generates random number ra as a key-encryption key signal.

(2) The first terminal 131 sends to the key distribution center 130, (ra, ta, REQ, sa)$^3$ mod n as a first ciphertext signal, which is encrypted by the key distribution center's public key, where:
Ta: time stamp for the first terminal 131,
REQ: request for the file access including file name and contents of the request (Read, Write, Delete, etc.) by the first terminal 131.
sa: the first terminal's secret identification number.

(3) The key distribution center 130 decrypts the first ciphertext signal using the key distribution center secret key d and obtains (ra, ta, REQ, sa). The key distribution center 130 extracts ra, ta, REQ and sa from decrypted data. The key distribution center 130 checks the validity of the time stamp ta and the secret identification sa to verify the first terminal 131.

(4) The key distribution center 130 sends the file access request (IDa, REQ) to the file server 126.

(5) The file server 126 checks the first terminal's access right to the requested file and generates a random number rf as a session key to be used between the first terminal 131 and the file server 126.

(6) The file server 126 sends (rf, IDa, ANS, sf, tf)$^3$ mod n as a second ciphertext signal, to the key distribution center 130, where:

tf: time stamp for the tile server
sf: the file server's secret identification number
ANS: the answer for the file access.

(7) The key distribution center 130 decrypts the second ciphertext signal and obtains (rf, IDa, ANS, sf, tf). The key distribution center 130 extracts rf, IDa, ANS, sf and tf from the decrypted data. The key distribution center 130 checks the validity of the time stamp tf and sf to verify the file server 126.

(8) The key distribution center 130 sends Ta, REQ, ANS, ra+rf mod n as a third ciphertext signal to the first terminal 131.

(9) The first terminal 131 processes random number ra to obtain random number rf as a session key if the request is accepted.

(10) Requested file is encrypted by the classical-key-encryption algorithm with random number rf and transferred to the first There are two problems with this protocol. The first is that the key from a terminal to the key distribution center is encrypted by the public key encryption algorithm. The public key encryption algorithm generally requires more processing time than the classical key encryption algorithm. The second is that the key distribution center needs to save the key encryption key (ra) until it receives the response from the file server.

DESCRIPTION OF THE PROTOCOL OF THE INVENTION

Figure 6:
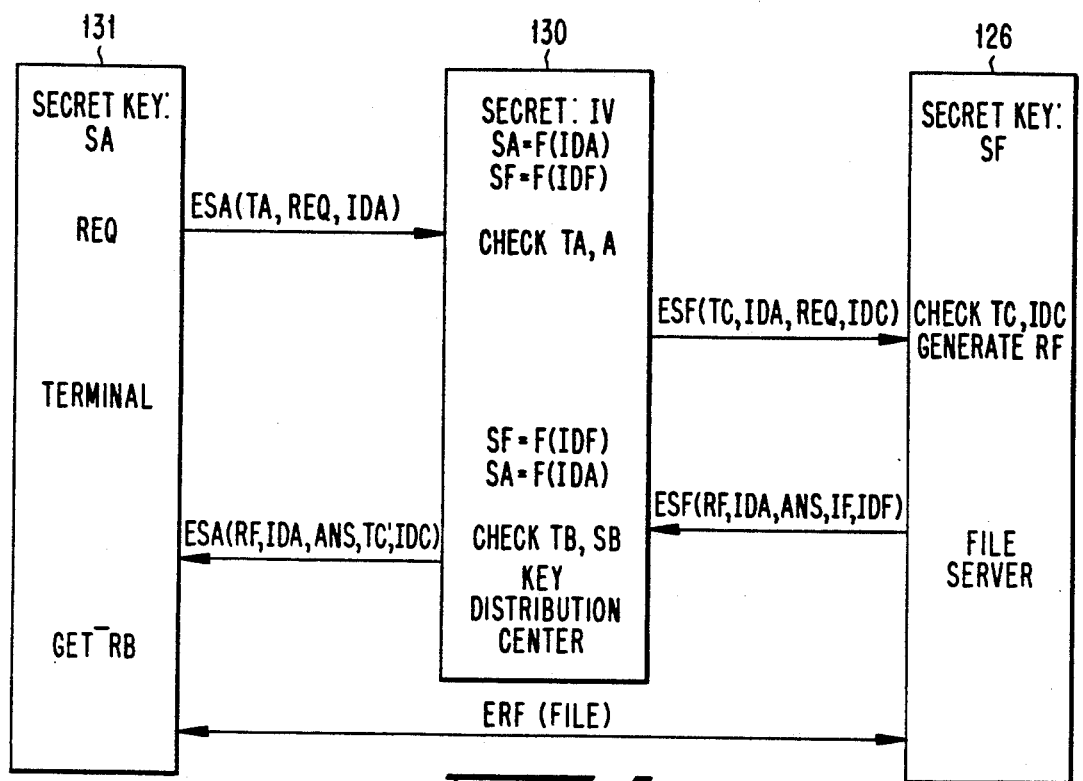
FIG. 6 illustrates a cryptographic communications system according to the present invention.
Figure 7:
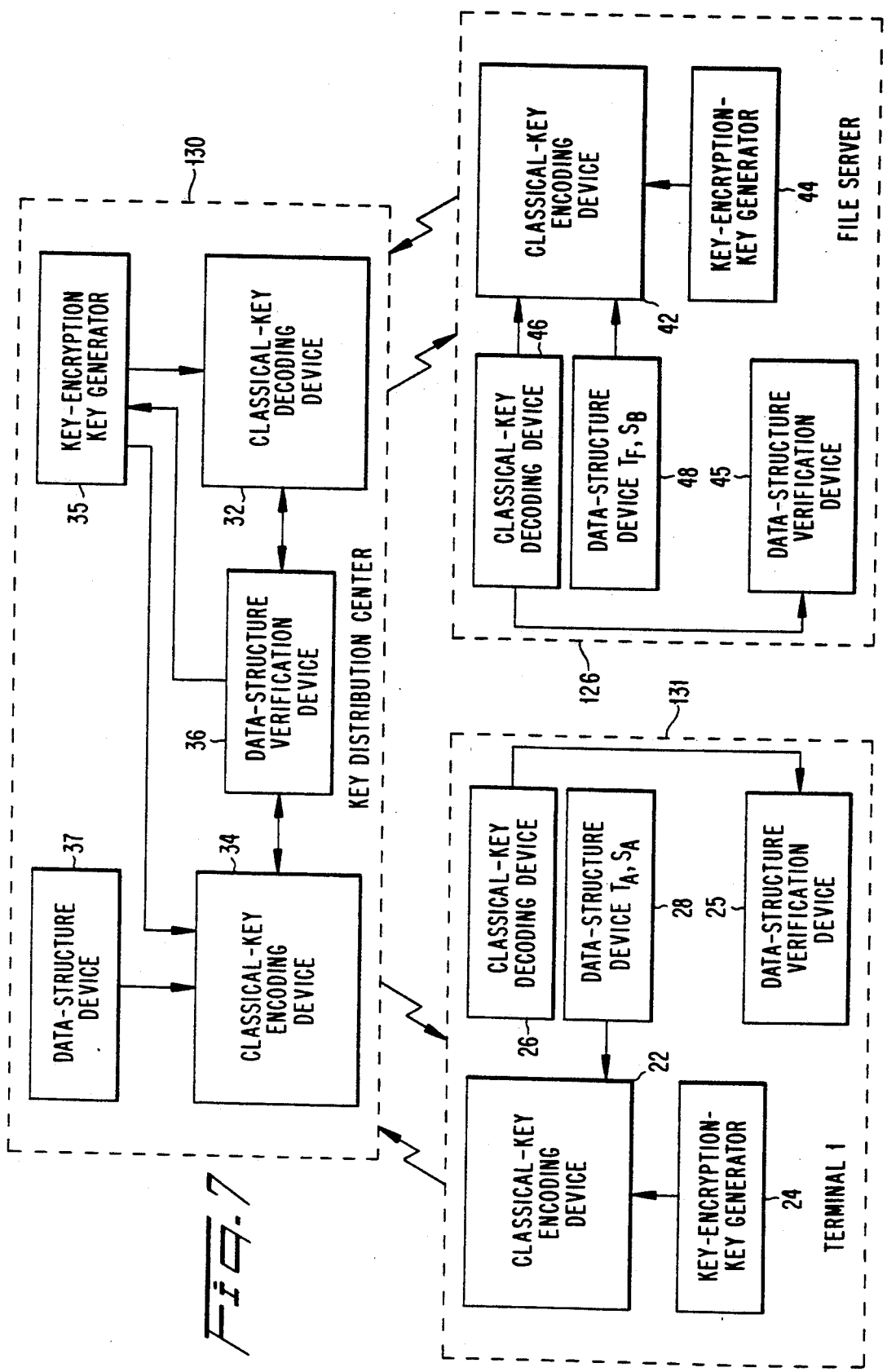
FIG. 7 illustrates a cryptographic communications system having a data-structure device according to the present invention.

In the exemplary arrangement shown in FIG. 6, a cryptographic communications system and method are provide for with a first terminal 131, a file server, a key-distribution center and a communications channel. The first terminal 131 includes first generating means, first encoding means, third decoding means, and third verifying means. The first terminal 131 optionally may have first structure means. Referring to FIG. 7, the first generating means may be embodied as a first key-encryption-key generator 24, and the first encoding means may be embodied as a first classical-key-encoding device 22. The first key-encryption-key generator 24 is coupled to the first 10 classical-key-encoding device 22.

The third decoding means is shown as third classical-key-decoding device 26 and the third verifying means is depicted as third data-structure-verification device 25. Also shown is first structure means embodied as first data-structure device 28. The first key-encryption-key generator 24 generates a first identification signal and a request signal.

The first data-structure device 28, if employed, generates a first structured-data signal. The first classical-key-encoding device 22 is coupled to the first key-encryption-key generator 24, the first data structure device 28, and the communications channel.

The first classical-key-encoding device 22 uses a classical-key encryption algorithm, such as the Data-Encryption Standard, with a first encryption-key signal. The first encryption-key signal is the key used with the Data Encryption Standard. The first encryption-key signal may be an identification signal previously sent to the first terminal 131 from the key-distribution center 130. The first classical-key-encoding device 22 transforms the first identification signal, the first structured-data signal and the request signal, to a first ciphertext signal. Additionally, the first classical-key-encoding device 22 transmits the first ciphertext signal over the communications channel.

The key-distribution center 130 includes first decoding means, first verifying means, second generating means, second encoding means, and optionally first structure-verifying means. Referring to FIG. 7, the first encoding means, first verifying means, second generating means, and second encoding means may be embodied as first classical-key-decoding device 32, first data-structure-verification device 36, second key-encryption-key generator 35, and second classical-key-encoding device 34. The first structure-verifying means may be embodied as part of the first data-structure-verification device 36, or as a similar device separate from the first data-structure-verification device 36.

The first classical-key-decoding device 32 is coupled to the second key-encryption-key generator 35, and to the communications channel. The first classical-key-decoding device 32 uses a classical-key-decryption algorithm with the first encryption-key signal. The first classical-key-decoding device 32 decodes the first ciphertext signal to generate, at the key-distribution center 130, the first identification signal, the structured-data signal and the request signal.

The first data-structure-verification device 36 is coupled to the first classical-key-decoding device 36. The first data-structure-verification device 36 verifies the first identification signal, and upon verifying the first identification signal, generates a first verification signal. The first data-structure-verification device 36 additionally verifies the first structured-data signal and generates a structured-verification signal.

The second key-encryption-key generator 35 is coupled to the first data-structure-verification device 36. In response to the first verification signal, the second key-encryption-key generator 35 generates a second identification signal. If the first structure-verifying means is employed with the structured-data signal, then the second classical-key-encoding device 34 is also responsive to the structured-verification signal. Otherwise, in response to the first verification signal, the second classical-key-encoding device 34 transforms the first identification signal, the second identification signal and the request signal to a second ciphertext signal, and transmits the second ciphertext signal over the communications channel. During this process, the second classical-key-encoding device 34 uses the classical-key-encryption algorithm with a second encryption-key signal.

The key-distribution center 130 also may have second structure means, which is depicted in FIG. 7 as second data-structure device 37 for generating a second structured-data signal. The second data-structure device 37 is coupled to the second classical-key-encoding device 34. When employing the second data-structure device 37, the second classical-key-encoding device 34 transforms the first identification signal, the request signal and the second structured-data signal to the second ciphertext signal.

The file server 126 includes second decoding means, second verifying means, third structure means, third generating means and third encoding means. The second terminal optionally would employ second structure-verifying means if the second structure means were employed at the key-distribution center. In FIG. 7, the second decoding means, the second verifying means, the third generating means and the third encoding means is shown as second classical-key-decoding device 46, second data-structure-verification device 45, third key-encryption-key generator 44, and third classical-key-encoding device 42, respectively. The third structure means is shown as third data-structure device 48.

The second classical key-decoding device 46 is coupled to the communications channel, and the second data-structure-verification device 45 is coupled to the second classical-key-decoding device 46. The third classical-key-encoding device 42 is coupled to the third key-encryption-key generator 44, the second classical-key-decoding device 46, and the communications channel.

The second classical-key-decoding device 46 uses the classical-key decryption algorithm with the second encryption-key signal. The second classical-key-decoding device 46 decodes the second ciphertext signal to generate the first identification signal, the second identification signal and the request signal. The second data-structure-verification device 45 verifies the second identification signal and verifies access rights of the first identification signal with respect to the request signal. In response to verifying the second identification signal and the access rights, the second data-structure-verification device 45 generates a second verification signal. If a structured-data signal were employed between the key-distribution center 130 and the file server 126, then the second data-structure-verification device 45 verifies the second structured-data signal embedded in the second ciphertext signal. In response to the second verification signal, and the second structured-verification signal and the request signal, the third key-encryption-key generator 44 generates a third identification signal, an answer signal, and a communication-encryption-key signal.

The third classical-key-encoding device 42 use the classical key encryption algorithm with the second encryption-key signal. The third classical key-encoding device 42 transforms the communication encryption-key signal, the answer signal, the first identification signal and the third identification signal, to a third ciphertext signal. Additionally, the third classical-key-encoding device 42 transmits the third ciphertext signal over the communications channel.

At the key distribution center 130, the first classical-key-decoding device 32 decodes, using the classical-key-decryption algorithm with the second encryption-key signal, the third ciphertext signal. Accordingly, the first classical-key-decoding device 32 outputs the communication-encryption-key signal, the answer signal, the first identification signal and the third identification signal. The first data structure-verification device 36 verifies the third identification signal, and in response to verifying the third identification signal, generates a third verification signal. Upon receiving the third verification signal, the second classical-key-encoding device 34 transforms the communications-encryption-key signal, the answer signal, the first identification signal and the second identification signal to a fourth ciphertext signal. The second classical-key-encoding device 34 uses the classical-key-encryption algorithm with the first encryption-key signal for this transformation. The second classical-key-encoding device 34 transmits the fourth ciphertext signal over the communications channel.

At the first terminal, the third classical-key-decoding device 26, which is coupled to the communications channel, decodes the fourth ciphertext signal, and outputs the communication-encryption-key signal, the answer signal, the first identification and the second identification signal. The third classical key-decoding device 26 uses the classical-key-decryption algorithm with the first encryption-key signal for the decoding. The third data-structure-verification device 25, which is coupled to the third classical-key-decoding device 26, verifies the first identification signal and the second identification signal. In response to the answer signal and to verifying the first identification signal and the second identification signal, the third data-structure-verification device 25 generates a fourth verification signal.

Upon receiving the fourth verification signal and the answer signal at the first terminal 131, means, located at the first terminal 131 and the file server 126, use the communication key-encryption signal for communicating between the first terminal 131 and the file server 126 with an encrypted signal. The communicating means may include the first classical-key-encoding device 22 and the third classical-key-decoding device 26 at the first terminal 131, and the third classical-key-encoding device 42 and the second classical-key-decoding device 46 at the file server 126.

Figure 8:
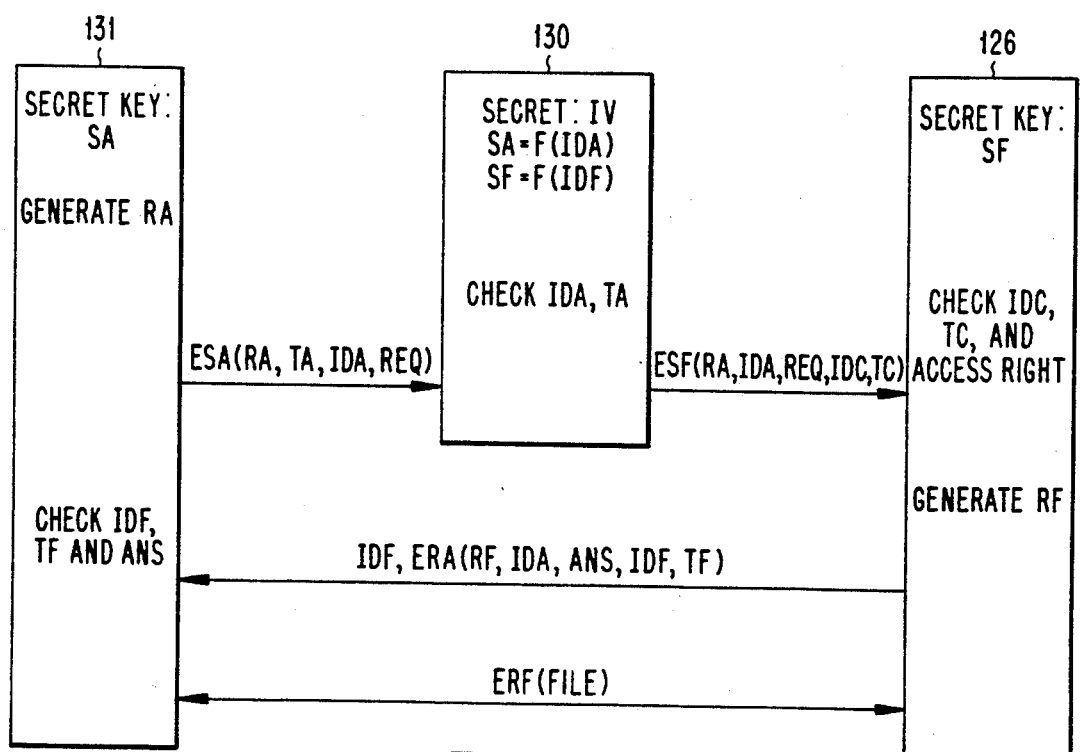
FIG. 8 illustrates a cryptographic communications system according to the present invention.

The present invention, as shown in FIG. 8, alternatively may have a path from the first terminal 131 to the key-distribution center 130 to the file server 126, and from the file server 126 back to the first terminal 131, bypassing the key-distribution center 130 when communicating from the file server 126 to the first terminal 131.

Referring to FIG. 6, the data to the key distribution center 130 is encrypted by the classical key encryption algorithm for a faster encryption processing instead of a public key encryption algorithm. The secret key si is the secret identification number from the previous use of the protocol. Cipher Block Chaining mode of the Data Encryption Standard, Federal Information Standards Publication 81 (FIPS PUB 81), National Bureau of Standards, 2 Dec. 1980, is used to prevent from the reuse of previously transmitted data by the malicious terminal.

The proposed protocol is, as illustratively shown in FIG. 6, can be summarized as follows:

The first terminal 131 receives the first encryption-key signal sa from key distribution center 130 from a previous use of the protocol, and holds it secret.

(1) The first terminal 131 sends $E_{sa}(t_a, REQ, ID_a)$ as a first ciphertext signal to the key distribution center 130, wherein:

IDa: the first terminal's first identification signal, which may be a number.

ta: time stamp

REQ: request signal for file access $E_{ri}(data)$: data is encrypted by the $i^{th}$ encryption-key signal ri between the $i^{th}$ terminal and the key distribution center 130.

(2) The key distribution center 130 decrypts the data generating the first encryption-key signal $sa = f(IDa)$ and obtains (ta, REQ, IDa). The key distribution center 130 extracts ta, REQ and IDa from decrypted data. The key distribution center 130 checks the validity of the time stamp ta. IDa verifies the first terminal 131. Function f(.) is a secret function generating the $i^{th}$ encryption-key signal from the $i^{th}$ terminal.

(3) The key distribution center 130 generates the second encryption key signal sf=f(IDf), which is used between the key distribution center 130 and the file server 126, and sends Esf(tc, IDa, REQ, IDc) as a second ciphertext signal to the file server 126.

(4) The file server 126 decrypts the second ciphertext signal using the first encryption-key signal sa and obtains (tc, IDa, REQ, IDc). The file server 126 extracts tc, IDa, REQ and IDc from the second ciphertext signal and checks the first terminal's access right to the requested file, the validity of the time stamp tc and IDc verify KDC. The file server 126 generates rf as a session key, which is to be used between the first terminal 131 and the file server 126.

(5) The file server 126 sends Esf(rf, IDa, ANS, tf, IDf) as the third ciphertext signal to the key distribution center 130, wherein:

ANS: the answer signal to the requested file access (6) The key distribution center 130 decrypts the third ciphertext signal and obtains (rf, IDA, ANS, tf, IDf). The key distribution center 130 extracts rf, IDa, ANS, IDf, tf from the decrypted data. The key distribution center 130 checks the validity of the time stamp tf. IDf verifies the file server 126.

(7) The key distribution center 130 sends Esa(rf, IDa, ANS, tc', IDc) as a fourth ciphertext signal to the first terminal 131.

(8) The first terminal 131 decrypts the fourth ciphertext signal to obtain (rf, IDa, ANS, tc', IDc), and extracts rf, IDa, ANS, tc' and IDc from decrypted data and obtains rf as a session key and checks that the first terminal's request is accepted by ANS and the validity of the time stamp tc'. IDc verifies the key distribution center 130.

(9) Requested file is encrypted by the secrecy key cryptosystems with the key rf and transfer from the file server 126 to first terminal 131.

In the second embodiment of the protocol, a key distribution 130 requires a fewer number of communications and less processing.

The second embodiment of the protocol, as illustratively shown in FIG. 8, can be summarized as follows:

The first terminal 131 receives the secret key sa from key distribution center 130 from a previous use of the protocol, and holds it secret.

(1) The first terminal 131 generates random number ra as a key-encryption key.

(2) The first terminal 131 sends Esa(ra, ta, IDa, REQ) as a first ciphertext signal to the key distribution center 130.

(3) The key distribution center 130 decrypts the first ciphertext signal with key sa using the equation sa=f-(IDa) and obtains (ra, ta, IDa, REQ). The key distribution center 130 extracts ra, ta, IDa, and REQ from decrypted data. The key distribution center 130 checks the validity of the time stamp ta. IDa verifies the first terminal 131.

(4) The key distribution center 130 generates secret key sf=f(IDf) and sends Esf(ra, IDa, REQ, IDc, tc) as a second ciphertext signal to the file server 126.

(5) The file server 126 decrypts the second ciphertext signal, with second encryption-key signal sf (ra, IDa, REQ, IDc, tc). The file server 126 extracts ra, IDa, Req., IDc, and tc from second ciphertext signal and checks the first terminal's access right to the requested file, the validity of the time stamp tc. IDc verifies the key distribution center 130.

(6) The file server 126 sends Era(rf, IDa, ANS, IDf, tf) as a third ciphertext signal to the first terminal 131.

(7) The first terminal 131 decrypts the third ciphertext signal to obtain rf, IDa, ANS, IDf and tf. The first terminal 131 checks if the request at ta is accepted by ANS and the validity of the time stamp tf. IDf verifies the file server 130. The first terminal 131 can get the session key rf from this request file.

(8) Requested file is encrypted with secret session key rf and transferred to the first terminal 131.

It will be apparent to those skilled in the art that various modifications can be made to the key-distribution protocol for file transfer in the computer network of the instant invention without departing from the scope or spirit of the invention, and it is intended that the present invention cover modifications and variations of the key-distribution protocol provided they come within the scope of the appended claims and there equivalents.

We claim:

1. A cryptographic communications system for use with a first terminal, a file server, a key-distribution center, and a communications channel, comprising:

first generating means, located at said first terminal, for generating a first identification signal and a request signal;

first encoding means, located at said first terminal and coupled to said first generating means and said communications channel, for transforming, using a Data Encryption Standard (DES) encryption algorithm with a first encryption-key signal, the first identification signal and the request signal, to a first ciphertext signal, and for transmitting the first ciphertext signal over said communications channel;

first decoding means, located at said key-distribution center and coupled to said communications channel, for decoding, using a Data Encryption Standard (DES) decryption algorithm with the first encryption-key signal, the first ciphertext signal, thereby generating the first identification signal and the request signal;

first verifying means, located at said key-distribution center and coupled to said first decoding means, for verifying the first identification signal, and responsive to verifying the first identification signal, for generating a first verification signal;

second generating means, located at said key-distribution center and coupled to said first verifying means, and, responsive to the first verification signal, for generating a second identification signal;

second encoding means, located at said key-distribution center and coupled to said second generating means and said communications channel, for transforming, using the DES encryption algorithm with a second encryption-key signal, the first identification signal, the second identification signal and the request signal, to a second ciphertext signal, and for transmitting the second ciphertext signal over said communications channel;

second decoding means, located at said file server and coupled to said communications channel, for decoding, using the DES decryption algorithm with the second encryption-key signal, the second ciphertext signal, thereby generating the first identification signal, the second identification signal and the request signal;

second verifying means, located at said file server and coupled to said second decoding means, for verifying the second identification signal and for verifying access rights of the first identification signal for the request signal, and, responsive to verifying the second identification signal and the access rights, for generating a second verification signal;

third generating means, located at said file server and responsive to the second verification signal and the request signal, for generating a third identification signal, an answer signal and a communication-encryption-key signal;

third encoding means, located at said file server and coupled to said third generating means, said second decoding means and said communications channel for transforming, using the DES encryption algorithm with the second encryption-key signal, the communication-encryption-key signal, the answer signal, the first identification signal and the third identification signal, to a third ciphertext signal, and for transmitting the third ciphertext signal over said communications channel;

wherein said first decoding means, located at said key-distribution center, decodes, using the DES decryption algorithm with the second encryption-key signal, the third ciphertext signal, thereby generating the communication-encryption-key signal, the answer signal, the first identification signal and the third identification signal;

wherein said first verifying means verifies the third identification signal, and, responsive to verifying the third identification signal, generates a third verification signal;

wherein said second encoding means, responsive to the third verification signal, transforms, using the DES encryption algorithm with the first encryption-key signal, the communication-encryption-key signal, the answer signal, the first identification signal and the second identification signal, to a fourth encryption signal, and transmits the fourth encryption signal over said communications channel;

third decoding means, located at said first terminal and coupled to said communications channel, for decoding, using the DES decryption algorithm with the first encryption-key signal, the fourth ciphertext signal, thereby generating the communication-encryption-key signal, the answer signal, the first identification signal and the second identification signal;

third verifying means, located at said first terminal and coupled to said third decoding means, for verifying the first identification signal and the second identification signal, and, responsive to the answer signal and to verifying the first identification signal and the second identification signal, for generating a fourth verification signal; and means, located at said first terminal and said file server, responsive to the fourth verification signal and the answer signal, and using the communication-encryption-key signal, for communicating between said first terminal and said file server with an encrypted signal.

2. The cryptographic system as set forth in claim 1 further including:

first structure means located at said first terminal for generating a first data signal; and wherein said first encoding means is coupled to said first structure means for transforming, using the DES encryption algorithm, the first identification signal, the request signal and the first data signal to the first ciphertext signal.

3. The cryptographic system as set forth in claim 2 further including first structure-verifying means located at said key-distribution center and coupled to said first decoding means for verifying the first data signal and for generating a first verification signal; and wherein said second encoding means is coupled to said first structure-verifying means and is responsive to the first verification signal for transforming, using the DES encryption algorithm, the first identification signal and the second identification signal to the second ciphertext signal and for transmitting the second ciphertext signal over said communications channel.

4. A cryptographic communications system for use with a first terminal, a file server, a key-distribution center, and a communications channel, comprising:

first generating means, located at said first terminal, for generating a first identification signal, a response key signal and a request signal;

first encoding means, located at said first terminal and coupled to said first generating means and said communications channel, for transforming, using a Data Encryption Standard (DES) encryption algorithm with a first encryption-key signal, the first identification signal, the response-key signal and the request signal, to a first ciphertext signal, and for transmitting the first ciphertext signal over said communications channel;

first decoding means, located at said key-distribution center and coupled to said communications channel, for decoding, using the Data Encryption Standard (DES) decryption algorithm with the first encryption-key signal, the first ciphertext signal, thereby generating the first identification signal, the response-key signal and the request signal;

first verifying means, located at said key-distribution center and coupled to said first decoding means, for verifying the first identification signal, and, responsive to verifying the first identification signal, for generating a first verification signal;

second generating means, located at said key-distribution center and coupled to said first verifying means, and, responsive to the first verification signal, for generating a second identification signal;

second encoding means, located at said key-distribution center and coupled to said second generating means and said communications channel, for transforming, using the DES encryption algorithm with a second encryption-key signal, the first identification signal, the second identification signal, the response-key signal and the request signal, to a second ciphertext signal, and for transmitting the second ciphertext signal over said communications channel;

second decoding means, located at said file server and coupled to said communications channel, for decoding, using the DES decryption algorithm with the second encryption-key signal, the second ciphertext signal, thereby generating the first identification signal, the second identification signal, the response-key signal and the request signal;

second verifying means, located at said file server and coupled to said second decoding means for verifying the second identification signal and for verifying access rights of the first identification signal for the request signal, and, responsive to verifying the second identification signal and the access rights, for generating a second verification signal;

third generating means, located at said file server and responsive to the second verification signal and the request signal, for generating a third identification signal, an answer signal and a communication-encryption-key signal;

third encoding means, located at said file server and coupled to said third generating means, said second decoding means and said communications channel, for transforming, using the DES encryption algorithm with the response-key signal, the communication-encryption-key signal, the answer signal the first identification signal and the third identification signal, to a third ciphertext signal, and for transmitting the third ciphertext signal over said communications channel;

third decoding means, located at said first terminal and coupled to said communications channel, for decoding, using the DES decryption algorithm with the response key signal, the third ciphertext signal, thereby generating the communication-encryption-key signal, the answer signal, the first identification signal and the third identification signal;

third verifying means, located at said first terminal and coupled to said third decoding means, for verifying the first identification signal and the third identification signal, and, responsive to the answer-signal and to verifying the first identification signal and the third identification signal, for generating a third verification signal; and means, located at said first terminal and said tile server, responsive to the third verification signal and the answer signal, and using the communication-encryption-key signal, for communicating between said first terminal and said file server with an encrypted signal.

5. The cryptographic system as set forth in claim 4 further including:

first structure means located at said first terminal for generating a first data signal; and wherein said first encoding means is coupled to said first structure means for transforming, using the DES encryption algorithm, the first identification signal, the request signal and the first data signal to the first ciphertext signal.

6. The cryptographic system as set forth in claim 5 further including structure-verifying means located at said key-distribution center and coupled to said first decoding means for verifying the first data signal and for generating a first verification signal; and wherein said second encoding means is coupled to said first structure-verifying means and is responsive to the first verification signal for transforming, using the DES encryption algorithm, the first identification signal and the second identification signal to the second ciphertext signal and for transmitting the second ciphertext signal over said communications channel.

7. A cryptographic communications method for use with a first terminal, a file server, a key-distribution center, and a communications channel, comprising the steps of:

generating, at said first terminal, a first identification signal and a request signal;

transforming, using a Data Encryption Standard (DES) encryption algorithm with a first encryption-key signal, at said first terminal, the first identification signal and the request signal, to a first ciphertext signal;

transmitting, from said first terminal, the first ciphertext signal over said communications channel;

decoding, using the Data Encryption Standard (DES) decryption algorithm with the first encryption-key signal, at said key-distribution center, the first ciphertext signal, thereby generating the first identification signal and the request signal;

verifying, at said key-distribution center, the first identification signal;

generating, at said key-distribution center, in response to verifying the first identification signal, a first verification signal;

generating, at said key-distribution center, in response to the first verification signal, a second identification signal:

transforming, using the DES encryption algorithm with a second encryption-key signal, at said key-distribution center, the first identification signal, the second identification signal and the request signal to a second ciphertext signal;

transmitting, from said key-distribution center, the second ciphertext signal over said communications channel;

decoding, at said file server, using the DES decryption algorithm with the second encryption-key signal, the second ciphertext signal, thereby generating the first identification signal, the second identification signal and the request signal;

verifying, at said file server, the second identification signal and access rights of the first identification signal for the request signal;

generating, at said file server, in response to verifying the second identification signal and the access rights, a second verification signal;

generating, at said file server, in response to the second verification signal and the request signal, a third identification signal, an answer signal and a communication-encryption-key signal;

transforming, at said file server, using the DES encryption algorithm with the second encryption-key signal, the communication-encryption-key signal, the answer signal, the first identification signal and the third identification signal, to a third ciphertext signal;

transmitting, from said file server, the third ciphertext signal over said communications channel;

decoding at said key-distribution center, using the DES decryption algorithm with the second encryption-key signal, the third ciphertext signal, thereby generating the communication-encryption key signal, the answer signal, the first identification signal and the third identification signal;

verifying, at said key-distribution center, the third identification signal;

generating, at said key-distribution center, in response to verifying the third identification signal, a third verification signal;

transforming, at said key-distribution center, in response to the third verification signal, using the DES encryption algorithm with the first encryption-key signal, the communication-encryption-key signal, the answer signal, the first identification signal and the second identification signal, to a fourth ciphertext signal;

transmitting, from said key-distribution center, the fourth ciphertext signal over said communications channel;

decoding, at said first terminal, using the DES decryption algorithm with the first encryption-key signal, the fourth ciphertext signal, thereby generating the communication-encryption-key signal, the answer signal, the first identification signal and the second identification signal;

verifying, at said first terminal, the first identification signal and the second identification signal;

generating, at said first terminal, in response to the answer signal and to verifying the first identification signal and the second identification signal, a fourth verification signal; and communicating, in response to the fourth verification signal and the answer signal, and using the communication-encryption-key signal, between said first terminal and said file server with an encrypted signal.

8. The method as set forth in claim 7 wherein:
said generating step at said first terminal includes generating a first data signal; and
said verifying step, at said key-distribution center, verifies the first time stamp signal.

9. A cryptographic communications method for use with a first terminal, a file server, a key-distribution center, and a communications channel, comprising the steps of:

generating, at said first terminal, a first identification signal, a response-key signal and a request signal;

transforming, at said first terminal, using a Data Encryption Standard (DES) encryption algorithm with a first encryption-key signal, the first identification signal, the response-key signal and the request signal, to a first ciphertext signal;

transmitting, from said first terminal, the first ciphertext signal over said communications channel;

decoding, at said key-distribution center, using Data Encryption Standard (DES) decryption algorithm with the first encryption-key signal, the first ciphertext signal, thereby generating the first identification signal, the response-key signal and the request signal;

verifying, at said key-distribution center, the first identification signal;

generating, at said key-distribution center, in response to verifying the first identification signal, a first verification signal;

generating, at said key-distribution center and in response to the first verification signal, a second identification signal;

transforming, at said key-distribution center, using the DES encryption algorithm with a second encryption-key signal, the first identification signal, the second identification signal, the response key signal and the request signal, to a second ciphertext signal;

transmitting, from said key distribution center, the second ciphertext signal over said communications channel;

decoding, at said file server, using the DES decryption algorithm with the second encryption-key signal, the second ciphertext signal, thereby generating the first identification signal, the second identification signal, the response key signal and the request signal;

verifying, at said file server, the second identification signal and access rights of the first for the request signal;

generating, at said file server, in response to verifying the second identification signal and the access rights, a second verification signal;

generating, at said file server and in response to the second verification signal and the request signal, a third identification signal, an answer signal and a communication-encryption-key signal;

transforming, at said file server, using the DES encryption algorithm with the response-key signal, the communication-encryption-key signal, the answer signal, the first identification signal and the third identification signal, to a third ciphertext signal;

transmitting, from said file server, the third ciphertext signal over said communications channel;

decoding, at said first terminal, using the DES decryption algorithm with the response-key signal, the third ciphertext signal, thereby generating the communication-encryption-key signal, the answer signal, the first identification signal and the third identification signal;

verifying, at said first terminal, the first identification signal and the third identification signal;

generating, at said first terminal, in response to the answer signal and to verifying the first identification signal and the third identification signal, a third verification signal; and communicating, in response to the third verification signal and the answer signal, and using the communication-encryption-key signal, between said first terminal and said file server with an encrypted signal.

10. The method as set forth in claim 9 wherein:
said generating step at said first terminal includes generating a first data signal; and
said verifying step, at said key-distribution center, verifies the first time stamp signal.

11. A cryptographic communications system for use with a first terminal, a file server, a key-distribution center, and a communications channel, comprising:

a first key-encryption-key generator, located at said first terminal, for generating a first identification signal and a request signal;

a first Data Encryption Standard (DES) encoding device, located at said first terminal and coupled to said first key-encryption-key generator and said communications channel, for transforming, using a DES encryption algorithm with a first encryption-key signal, the first identification signal and the request signal, to a first ciphertext signal, and for transmitting the first ciphertext signal over said communications channel;

a first Data Encryption Standard (DES) decoding device, located at said key-distribution center and coupled to said communications channel, for decoding, using the DES decryption algorithm with the first encryption-key signal, the first ciphertext signal, thereby generating the first identification signal and the request signal;

a first data-structure-verification device, located at said key-distribution center and coupled to said first DES decoding device, for verifying the first identification signal, and responsive to verifying the first identification signal, for generating a first verification signal;

a second key-encryption-key generator, located at said key-distribution center and coupled to said first data-structure-verification device, and, responsive to the first verification signal, for generating a second identification signal;

a second DES encoding device, located at said key-distribution center and coupled to said second key-encryption-key generator and said communications channel, for transforming, using the DES encryption algorithm with a second encryption-key signal, the first identification signal, the second identification signal and the request signal, to a second ciphertext signal, and for transmitting the second ciphertext signal over said communications channel;

a second DES decoding device, located t said file server and coupled to said communications channel, for decoding, using the DES decryption algorithm with the second encryption-key signal, the second ciphertext signal, thereby generating the first identification signal, the second identification signal and the request signal;

a second data-structure-verification device, located at said file server and coupled to said second DES decoding device, for verifying the second identification signal and for verifying access rights of the first identification signal for the request signal, and, responsive to verifying the second identification signal and the access rights, for generating a second verification signal;

a third key-encryption-key generator, located at said file server and responsive to the second verification signal and the request signal, for generating a third identification signal, an answer signal and a communication-encryption-key signal;

a third DES encoding device, located at said file server and coupled to said third key-encryption-key generator, said second DES decoding device and said communications channel for transforming, using the DES encryption algorithm with the second encryption-key signal, the communication-encryption-key signal, the answer signal, the first identification signal and the third identification signal, to a third ciphertext signal, and for transmitting the third ciphertext signal over said communications channel;

wherein said first DES decoding device, located at said key-distribution center, decodes, using the DES decryption algorithm with the second encryption-key signal, the third ciphertext signal, thereby generating the communication-encryption-key signal, the answer signal, the first identification signal and the third identification signal;

wherein said first data-structure-verification device verifies the third identification signal, and, responsive to verifying the third identification signal, generates a third verification signal;

wherein said second DES encoding device, responsive to the third verification signal, transforms, using the DES encryption algorithm with the first encryption-key signal, the communication-encryption-key signal, the answer signal, the first identification signal and the second identification signal, to a fourth encryption signal, and transmits the fourth encryption signal over said communications channel;

a third DES decoding device, located at said first terminal and coupled to said communications channel, for decoding, using the DES decryption algorithm with the first encryption-key signal, the fourth ciphertext signal, thereby generating the communication-encryption-key signal, the answer signal, the first identification signal and the second identification signal;

a third data-structure-verification device, located at said first terminal and coupled to said third DES decoding device, for verifying the first identification signal and the second identification signal, and, responsive to the answer signal and to verifying the first identification signal and the second identification signal, for generating a fourth verification signal; and wherein said first DES encoding device, said third DES decoding device, said second DES decoding device, and said third DES encoding device, responsive to the fourth verification signal and the answer signal, and using the communication-encryption-key signal, communicate between said first terminal and said file server with an encrypted signal.

12. The cryptographic system as set forth in claim 11 further including:

a first data-structure device located at said first terminal for generating a first data signal; and wherein said first DES encoding device is coupled to said first data-structure device for transforming, using the DES encryption algorithm, the first identification signal, the request signal and the first data signal to the first ciphertext signal.

13. The cryptographic system as set forth in claim 12 wherein said first data-structure-verification device verifies the first data signal and generates a first verification signal; and wherein said second DES encoding device is coupled to said first data-structure-verification device and is responsive to the first verification signal for transforming, using the DES encryption algorithm, the first identification signal and the second identification signal to the second ciphertext signal and for transmitting the second ciphertext signal over said communications channel.

14. A cryptographic communications system for use with a first terminal, a file server, a key-distribution center, and a communications channel, comprising:

a first key-encryption-key generator, located at said first terminal, for generating a first identification signal, a response-key signal and a request signal;

a first Data Encryption Standard (DES) encoding device, located at said first terminal and coupled to said first key-encryption-key generator and said communications channel, for transforming, using a DES encryption algorithm with a first encryption-key signal, the first identification signal, the response-key signal and the request signal, to a first ciphertext signal, and for transmitting the first ciphertext signal over said communications channel;

a first Data Encryption Standard (DES) decoding device, located at said key-distribution center and coupled to said communications channel, for decoding, using the DES decryption algorithm with the first encryption-key signal, the first ciphertext signal, thereby generating the first identification signal, the response-key signal and the request signal;

a first data-structure-verification device, located at said key-distribution center and coupled to said first DES decoding device, for verifying the first identification signal, and, responsive to verifying the first identification signal, for generating a first verification signal;

a second key-encryption-key generator, located at said key-distribution center and coupled to said first data-structure-verification device, and, responsive to the first verification signal, for generating a second identification signal;

a second DES encoding device, located at said key-distribution center and coupled to said second key-encryption-key generator and said communications channel, for transforming, using the DES encryption algorithm with a second encryption-key signal, the first identification signal, the second identification signal, the response-key signal and the request signal, to a second ciphertext signal, and for transmitting the second ciphertext signal over said communications channel;

a second DES decoding device, located at said file server and coupled to said communications channel, for decoding, using the DES decryption algorithm with the second encryption-key signal, the second ciphertext signal, thereby generating the first identification signal, the second identification signal, the response-key signal and the request signal;

a second data-structure-verification device, located at said file server and coupled to said second DES decoding device for verifying the second identification signal and for verifying access rights of the first identification signal for the request signal, and, responsive to verifying the second identification signal and the access rights, for generating a second verification signal;

a third key-encryption-key generator, located at said file server and responsive to the second verification signal and the request signal, for generating a third identification signal, an answer signal and a communication-encryption-key signal;

a third DES encoding device, located at said file server and coupled to said third key-encryption-key generator, said second DES decoding device and said communications channel, for transforming, using the DES encryption algorithm with the response-key signal, the communication-encryption-key signal, the answer signal, the first identification signal and the third identification signal, to a third ciphertext signal, and for transmitting the third ciphertext signal over said communications channel;

a third DES decoding device, located at said first terminal and coupled to said communications channel, for decoding, using the DES decryption algorithm with the response-key signal, the third ciphertext signal, thereby generating the communication-encryption-key signal, the answer signal, the first identification signal and the third identification signal;

a third data-structure-verification device, located at said first terminal and coupled to said third DES decoding device, for verifying the first identification signal and the third identification signal, and, responsive to the answer-signal and to verifying the first identification signal and the third identification signal, for generating a third verification signal; and wherein said first DES encoding device, said third DES decoding device, said second DES decoding device, and said third DES encoding device, responsive to the third verification signal and the answer signal, and using the communication-encryption-key signal, communicate between said first terminal and said file server with an encrypted signal.

15. The cryptographic system as set forth in claim 14 further including:

a first data-structure device located at said first terminal for generating a first data signal; and wherein said first DES encoding device is coupled to said first data-structure device for transforming, using the DES encryption algorithm, the first identification signal, the request signal and the first data signal to the first ciphertext signal.

16. The cryptographic system as set forth in claim 15 wherein said first data-structure-verification device verifies the first data signal and generates a first verification signal; and wherein said second DES encoding device is coupled to said first data-structure-verification device and is responsive to the first verification signal for transforming, using the DES encryption algorithm, the first identification signal and the second identification signal to the second ciphertext signal and for transmitting the second ciphertext signal over said communications channel.

17. A cryptographic communications method comprising the steps of:

generating a first identification signal and a request signal;

transforming, using a Data Encryption Standard (DES) encryption algorithm with a first encryption-key signal, the first identification signal and the request signal, to a first ciphertext signal;

transmitting the first ciphertext signal;

decoding, using the Data Encryption Standard (DES) decryption algorithm with the first encryption-key signal, the first ciphertext signal, thereby generating the first identification signal and the request signal;

verifying the first identification signal;

generating, in response to verifying the first identification signal, a first verification signal;

generating, in response to the first verification signal, a second identification signal;

transforming, using the DES encryption algorithm with a second encryption-key signal, the first identification signal, the second identification signal and the request signal to a second ciphertext signal;

transmitting the second ciphertext signal;

decoding, using the DES decryption algorithm with the second encryption-key signal, the second ciphertext signal, thereby generating the first identification signal, the second identification signal and the request signal;

verifying the second identification signal and access rights of the first identification signal for the request signal;

generating, in response to verifying the second identification signal and the access rights, a second verification signal;

generating, in response to the second verification signal and the request signal, a third identification signal, an answer signal and a communication-encryption-key signal;

transforming, using the DES encryption algorithm with the second encryption-key signal, the communication-encryption-key signal, the answer signal, the first identification signal and the third identification signal, to a third ciphertext signal;

transmitting the third ciphertext signal;

decoding, using the DES decryption algorithm with the second encryption-key signal, the third ciphertext signal, thereby generating the communication-encryption key signal, the answer signal, the first identification signal and the third identification signal;

verifying the third identification signal;

generating, in response to verifying the third identification signal, a third verification signal;

transforming, in response to the third verification signal, using the DES encryption algorithm with the first encryption-key signal, the communication-encryption-key signal, the answer signal, the first identification signal and the second identification signal, to a fourth ciphertext signal;

transmitting the fourth ciphertext signal;

decoding, using the DES decryption algorithm with the first encryption-key signal, the fourth ciphertext signal, thereby generating the communication-encryption-key signal, the answer signal, the first identification signal and the second identification signal;

verifying the first identification signal and the second identification signal;

generating, in response to the answer signal and to verifying the first identification signal and the second identification signal, a fourth verification signal; and communicating, in response to the fourth verification signal and the answer signal, and using the communication-encryption-key signal, with an encrypted signal.

18. The method as set forth in claim 17 wherein:

said generating step includes generating a first data signal; and said verifying step verifies the first time stamp signal.

19. A cryptographic communications method comprising the steps of:

generating a first identification signal, a response-key signal and a request signal;

transforming using a Data Encryption Standard (DES) encryption algorithm with a first encryption-key signal, the first identification signal, the response-key signal and the request signal, to a first ciphertext signal;

transmitting the first ciphertext signal;

decoding, using the Data Encryption Standard (DES) decryption algorithm with the first encryption-key signal, the first ciphertext signal, thereby generating the first identification signal, the response-key signal and the request signal;

verifying the first identification signal;

generating, in response to verifying the first identification signal, a first verification signal;

generating, in response to the first verification signal, a second identification signal;

transforming, using the DES encryption algorithm with a second encryption-key signal, the first identification signal, the second identification signal, the response-key signal and the request signal, to a second ciphertext signal;

transmitting the second ciphertext signal;

decoding, using the DES decryption algorithm with the second encryption-key signal, the second ciphertext signal, thereby generating the first identification signal, the second identification signal, the response-key signal and the request signal;

verifying the second identification signal and access rights of the first identification signal for the request signal;

generating, in response to verifying the second identification signal and the access rights, a second verification signal;

generating, in response to the second verification signal and the request signal, a third identification signal, an answer signal and a communication-encryption-key signal;

transforming, using the DES encryption algorithm with the response-key signal, the communication-encryption-key signal, the answer signal, the first identification signal and the third identification signal, to a third ciphertext signal;

transmitting the third ciphertext signal;

decoding using the DES decryption algorithm with the response-key signal, the third ciphertext signal, thereby generating the communication-encryption-key signal, the answer signal, the first identification signal and the third identification signal;

verifying the first identification signal and the third identification signal;

generating in response to the answer signal and to verifying the first identification signal and the third identification signal, a third verification signal; and communicating, in response to the third verification signal and the answer signal, and using the communication-encryption-key signal, with an encrypted signal.

20. The method as set forth in claim 19 wherein:

said generating step includes generating a first data signal; and said verifying step verifies the first time stamp signal.

21. The cryptographic system as set forth in claim 3 further including:

second structure means located at said key-distribution center for generating a second data signal; and wherein said second encoding means is coupled to said second structure means for transforming, using the DES encryption algorithm, the first identification signal, the request signal and the second data signal to the second ciphertext signal.

22. The cryptographic system as set forth in claim 21 further including second structure-verifying means located at a second terminal and coupled to said second decoding means for verifying the second data signal and for generating a second verification signal; and wherein said second encoding means is coupled to said second structure-verifying means and is responsive to the second verification signal for transforming, using the DES encryption algorithm, the first identification signal and the second identification signal to the second ciphertext signal and for transmitting the second ciphertext signal over said communications channel.

23. The cryptographic system as set forth in claim 6 further including:

second structure means located at said key-distribution center for generating a second data signal; and wherein said second encoding means is coupled to said second structure means for transforming, using the DES encryption algorithm, the first identification signal, the request signal and the second data signal to the second ciphertext signal.

24. The cryptographic system as set forth in claim 23 further including second structure-verifying means located at a second terminal and coupled to said second decoding means for verifying the second data signal and for generating a second verification signal; and wherein said second encoding means is coupled to said second structure-verifying means and is responsive to the second verification signal for transforming, using the DES encryption algorithm, the first identification signal and the second identification signal to the second ciphertext signal and for transmitting the second ciphertext signal over said communications channel.

25. The cryptographic system as set forth in claim 13 further including:

a second data-structure device located at said key-distribution center for generating a second data signal; and wherein said second DES encoding device is coupled to said second data-structure device for transforming, using the DES encryption algorithm, the first identification signal, the request signal and the second data signal to the second ciphertext signal.

26. The cryptographic system as set forth in claim 25 wherein said second data-structure-verification device verifies the second data signal and generates a second verification signal; and wherein said second DES encoding device is coupled to said second data-structure-verification device and is responsive to the second verification signal for transforming, using the DES encryption algorithm, the first identification signal and the second identification signal to the second ciphertext signal and for transmitting the second ciphertext signal over said communications channel.

27. The cryptographic system as set forth in claim 16 further including:

a second data-structure device located at said key-distribution center for generating a second data signal; and wherein said second DES encoding device is coupled to said second data-structure device for transforming, using the DES encryption algorithm, the first identification signal, the request signal and the second data signal to the second ciphertext signal.

28. The cryptographic system as set forth in claim 27 wherein said second data-structure-verification device verifies the second data signal and generates a second verification signal; and wherein said second DES encoding device is coupled to said second data-structure-verification device and is responsive to the second verification signal for transforming, using the DES encryption algorithm, the first identification signal and the second identification signal to the second ciphertext signal and for transmitting the second ciphertext signal over said communications channel.

* * * * *